(12) United States Patent
Homma et al.

(10) Patent No.: US 11,451,513 B2
(45) Date of Patent: Sep. 20, 2022

(54) NOTIFICATION DEVICE AND NOTIFICATION METHOD

(71) Applicant: NIPPON TELEGRAPH AND TELEPHONE CORPORATION, Tokyo (JP)

(72) Inventors: Shunsuke Homma, Tokyo (JP); Hidetaka Nishihara, Tokyo (JP); Aki Fukuoka, Tokyo (JP); Toru Okugawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/266,327

(22) PCT Filed: Aug. 5, 2019

(86) PCT No.: PCT/JP2019/030683
§ 371 (c)(1),
(2) Date: Feb. 5, 2021

(87) PCT Pub. No.: WO2020/031946
PCT Pub. Date: Feb. 13, 2020

(65) Prior Publication Data
US 2021/0320899 A1 Oct. 14, 2021

(30) Foreign Application Priority Data
Aug. 8, 2018 (JP) .............................. JP2018-149703

(51) Int. Cl.
*G06F 15/16* (2006.01)
*H04L 61/5076* (2022.01)
*H04L 12/46* (2006.01)

(52) U.S. Cl.
CPC ...... *H04L 61/5076* (2022.05); *H04L 12/4633* (2013.01)

(58) Field of Classification Search
None
See application file for complete search history.

(56) References Cited

U.S. PATENT DOCUMENTS

2013/0150024 A1* 6/2013 Burbidge .............. H04W 76/19
455/423
2015/0257142 A1* 9/2015 Ueda ................. H04W 72/0406
370/329
(Continued)

FOREIGN PATENT DOCUMENTS

JP 2012108733 A * 6/2012
JP 2016001922 A * 1/2016 ............ H04W 40/20

OTHER PUBLICATIONS

Farinacci et al. (2013) "The Locator/ID Separation Protocol (LISP)," Internet Engineering Task Force (IETF), Jan. 2013, 75 pages.
(Continued)

*Primary Examiner* — Phyllis A Book

(57) ABSTRACT

A storage unit (14) stores a terminal identifier for identifying a terminal, locator information indicating a transfer node to which a terminal is connected, a candidate terminal identifier for identifying a candidate terminal that is a communication destination candidate of the terminal, and candidate locator information indicating a transfer node to which the candidate terminal is connected in association with each other. An acquisition unit (15a) acquires, from a transfer node to which a terminal is newly connected, mapping information in which a locator information indicating the transfer node and a terminal identifier of the terminal are associated and stores the mapping information in the storage unit (14). A notification unit (15b) notifies the transfer node to which the terminal is newly connected of the candidate terminal iden- (Continued)

tifier and the candidate locator information stored in association with the terminal identifier that is acquired in the storage unit (14).

20 Claims, 4 Drawing Sheets

(56) References Cited

U.S. PATENT DOCUMENTS

| | | | |
|---|---|---|---|
| 2015/0350808 A1* | 12/2015 | Kimura | H04W 28/0215 370/329 |
| 2018/0034905 A1* | 2/2018 | Sato | H04W 40/248 |
| 2018/0070264 A1* | 3/2018 | Saiwai | H04W 72/04 |
| 2018/0241696 A1* | 8/2018 | Sindhu | H04L 49/70 |
| 2019/0342215 A1* | 11/2019 | Jain | H04L 45/742 |

OTHER PUBLICATIONS

Fuller & Farinacci (2013) "Locator/ID Separation Protocol (LISP) Map-Server Interface," Internet Engineering Task Force (IETF), Jan. 2013, 13 pages.

\* cited by examiner

| EID | RLOC | COMMUNICATION DESTINATION CANDIDATE | |
|---|---|---|---|
| | | EID | RLOC |
| a::1 | A | c::1 | N |
| | | a::3 | B |
| b::1 | B | a::1 | A |
| ... | ... | ... | |

NOTIFICATION DEVICE AND NOTIFICATION METHOD

CROSS-REFERENCE TO RELATED APPLICATIONS

This application is a U.S. 371 Application of International Patent Application No. PCT/JP2019/030683, filed on 5 Aug. 2019, which application claims priority to and the benefit of JP Application No. 2018-149703, filed on 8 Aug. 2018, the disclosures of which are hereby incorporated herein by reference in their entireties.

TECHNICAL FIELD

The present invention relates to a notification apparatus and a notification method.

BACKGROUND ART

In Internet Protocol (IP) networks of the known art, an IP address has two meanings which are, locator information indicating a location of a terminal, and a terminal identifier for identifying the terminal. Thus, when the terminal moves, a change of the IP address of the terminal or rerouting within the network is required.

Here, the change of the IP address involves disconnection of a communication session such as a TCP, and thus, reconnection to a service in use is required. Even in a service in which the session is maintainable before and after the movement of the terminal such as a telephone, a packet loss occurs before and after the change of the IP address. In a network in which the number of terminals to be connected is larger, it is inefficient to perform routing whenever the terminal moves.

Thus, a scheme for separately operating the terminal identifier and the locator information has been proposed. For example, in a Locator ID Separation Protocol (LISP) (see Non Patent Literature 1 and Non Patent Literature 2), a mapping server manages mapping information in which an EID which is a unique identifier assigned to the terminal and locator information indicating Ingress/Egress Tunnel Router (xTR) to which each terminal is connected are associated.

Here, Ingress Tunnel Router (ITR) is a tunnel router that encapsulates a packet on a transmission side site, and Egress Tunnel Router (ETR) is a tunnel router that decapsulates the packet on a destination side site. Specifically, let an encapsulated packet flows in a tunnel stretched between the ITR and the ETR. The xTR is a tunnel router that serves both the ITR and the ETR.

For example, when the packet is received from a subordinate terminal X, an xTR #1 acquires the mapping information in which the EID and the xTR are associated from the mapping server, discriminates an xTR #n to which a terminal Y as a communication destination is connected, and transfers the packet to the xTR #n which is a facing xTR by using the tunnel. When the packet transferred from the xTR #1 is received, the xTR #n transfers the packet to the subordinate terminal Y.

CITATION LIST

Non Patent Literature

Non Patent Literature 1: "The Locator/ID Separation Protocol (LISP)", [online], January, 2013, IETF, RFC 6830, [searched on Jul. 6, 2018], Internet <URL: https://tools.ietforg/html/rfc6830>

Non Patent Literature 2: "Locator/ID Separation Protocol (LISP) Map-Server Interface", [online], January, 2013, IETF, RFC 6833, [searched on Jul. 10, 2018], Internet <URL: https://tools.ietf.org/html/rfc6833>

SUMMARY OF THE INVENTION

Technical Problem

However, in the technology of the known art, a waiting time may occur in acquiring the locator information of the xTR to which the terminal as the communication destination is connected at the start of communication. For example, when the locator information of the xTR to which the terminal as the communication destination is connected is not acquired, the xTR as a transmission source inquires of the mapping server about the locator information of the xTR to which the terminal as the communication destination is connected, and thus, the waiting time occurs in the acquisition of the locator information. In this case, the xTR as the transmission source cannot start communication with the terminal as the communication destination until the locator information of the xTR to which the terminal as the communication destination is connected is discriminated, and thus, processing for dropping or storing (caching) the packet is required.

Here, when the packet is dropped, there is a concern that deterioration in communication speed and quality such as occurrence of a packet loss or a delay occur. When the packet is stored, there is a concern that cost of an apparatus increases. In particular, in a situation in which a plurality of terminals is present and moves frequently, it may be difficult to prepare sufficient caches.

The present invention has been made in view of the aforementioned problem, and an object of the present invention is to suppress occurrence of a waiting time required to acquire locator information of a transfer node to which a terminal as a communication destination is connected at the start of communication.

Means for Solving the Problem

To resolve the above-described problem and achieve the object, a notification apparatus according to the present invention includes a storage unit configured to store a terminal identifier for identifying a terminal, locator information indicating a transfer node to which the terminal is connected, a candidate terminal identifier for identifying a candidate terminal which is a communication destination candidate of the terminal, and candidate locator information indicating a transfer node to which the candidate terminal is connected in association with each other, an acquisition unit configured to acquire, from a transfer node to which a terminal is newly connected, a locator information indicating the transfer node to which the terminal is newly connected and a terminal identifier of the terminal that is newly connected and store the locator information and the terminal identifier that are acquired in the storage unit, and a notification unit configured to notify the transfer node to which the terminal is newly connected of the candidate terminal identifier and the candidate locator information stored in association with the terminal identifier that is acquired in the storage unit.

Effects of the Invention

According to the present invention, it is possible to suppress occurrence of a waiting time required to acquire locator information of a transfer node to which a terminal as a communication destination is connected at the start of communication.

DESCRIPTION OF EMBODIMENTS

Hereinafter, an embodiment of the present invention will be described in detail with reference to the drawings. In the present embodiment, a mapping server is applied to a notification apparatus according to the present invention. Note that the present invention is not limited by the embodiment. In illustration of the drawings, the same parts are denoted by the same reference signs.

System Configuration

Figure 1:
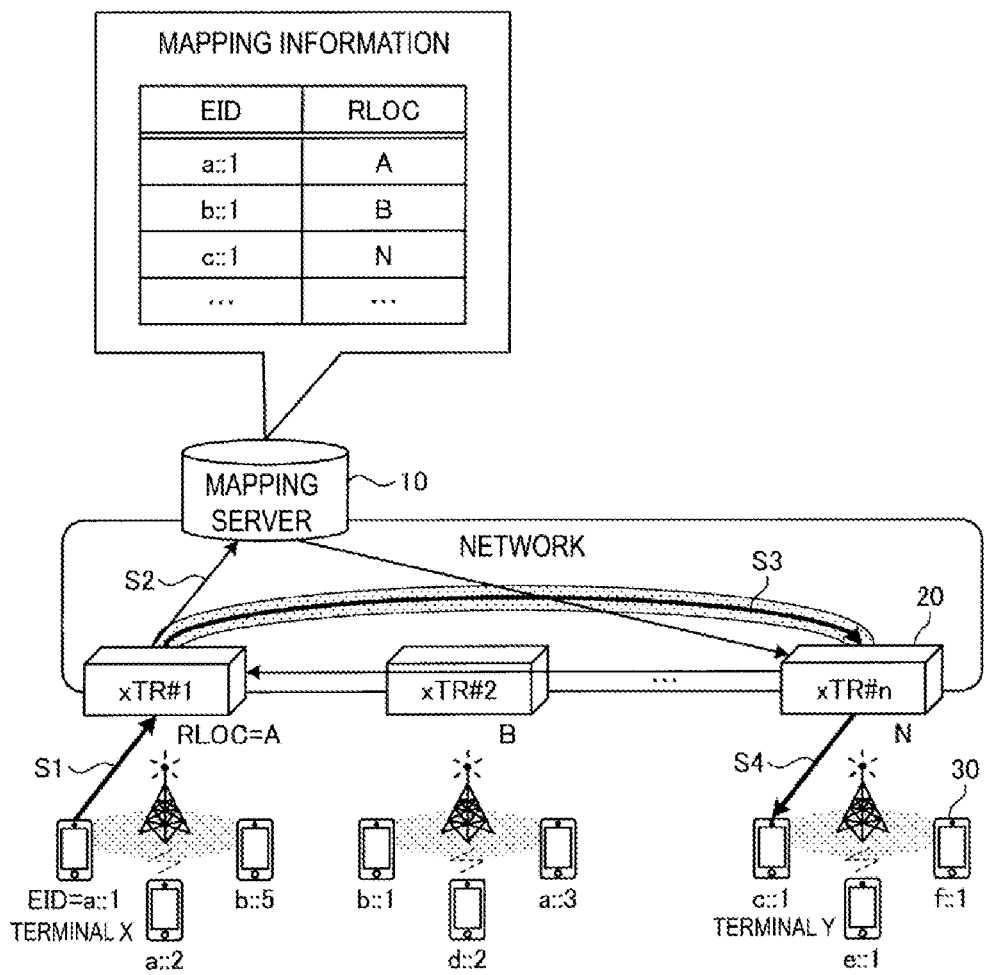
FIG. 1 is a schematic diagram illustrating a configuration of a system including a notification apparatus according to the present embodiment.

FIG. 1 is a diagram illustrating a configuration of a system configuration including the notification apparatus according to the present embodiment. Referring to FIG. 1, processing of a system including a mapping server 10 as the notification apparatus of the present embodiment will be described. Note that the present embodiment will be described by using the terminology of LISP. As illustrated in FIG. 1, xTRs 20 which are a plurality of transfer nodes are arranged in a network. The mapping server 10 acquires mapping information in which an EID of a terminal 30 and locator information (Routing LOCator or RLOC) of the xTR 20 to which the terminal 30 is connected are associated periodically or according to a request of each terminal 30 present in the network, and stores and manages the mapping information in a storage unit.

For example, when a terminal X (EID=a::1) starts communication with a terminal Y (EID=c::1) as a communication destination (step S1), an xTR #1 to which the terminal X is connected acquires the mapping information from the mapping server 10 (step S2). The xTR #1 discriminates an xTR #n to which the terminal Y as the communication destination is connected, and transfers a packet to the xTR #n by using a tunnel (step S3). When the packet transferred from the xTR #1 is received, the xTR #n transfers the packet to the subordinate terminal Y (S4).

Here, when xTR #1 as a transmission source does not acquire the locator information of the xTR #n to which the terminal Y as the communication destination is connected, the transmission source inquires of the mapping server 10 about the locator information of the xTR #n to which the terminal Y is connected, and thus, a waiting time for acquiring the locator information. In this case, the xTR #1 as the transmission source cannot transfer the packet until the xTR #n to which the terminal Y is connected is discriminated, and there is a possibility that a packet loss or a transfer delay due to buffering occurs.

The mapping server 10 of the present embodiment performs notification processing to be described below to prevent a situation in which the xTR 20 as the transmission source does not acquire the locator information of the xTR #n to which the terminal Y as the communication destination is connected at the start of communication. In other words, the mapping server 10 stores mapping information of communication destination candidates of each terminal in advance for each terminal 30. When the terminal X is newly connected to the xTR #1 by movement, the mapping server 10 acquires the locator information of the xTR #1 to which the terminal X is connected from the xTR #1, and transmits the mapping information of the communication destination candidates of the terminal X back to the xTR #1.

When the terminal Y is included in the communication destination candidates, the xTR #1 to which the terminal X is newly connected does not inquire of the mapping server 10 about the locator information of the xTR #n to which the terminal Y as the communication destination is connected, and the terminal X can start communicating with the terminal Y.

Configuration of Mapping Server

Figures 2, 3:
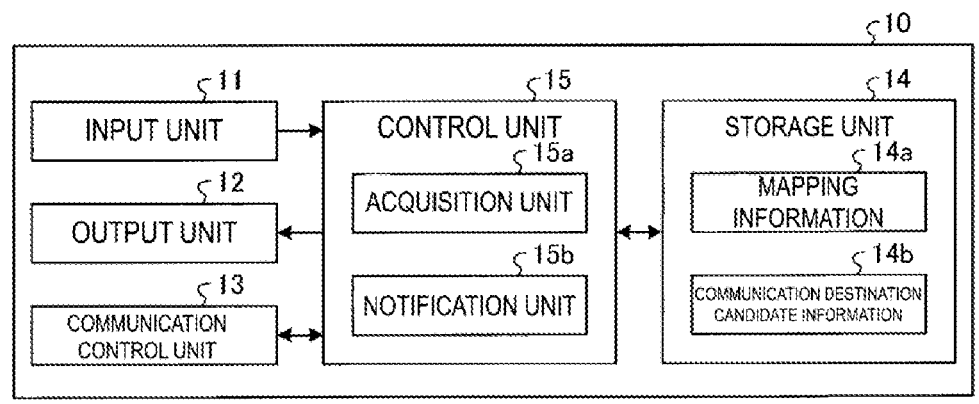
FIG. 2 is a schematic diagram illustrating a schematic configuration of the notification apparatus according to the present embodiment.
FIG. 3 is a diagram illustrating a data configuration of mapping information and communication destination candidate information.

Next, FIG. 2 is a schematic diagram illustrating a schematic configuration of the notification apparatus according to the present embodiment. As illustrated in FIG. 2, the mapping server 10 which is the notification apparatus according to the present embodiment is implemented by a general-purpose computer such as a work station or a server apparatus, and includes an input unit 11, an output unit 12, a communication control unit 13, a storage unit 14, and a control unit 15.

The input unit 11 is implemented by using an input apparatus such as a keyboard and a mouse, and inputs various kinds of command information for starting processing to the control unit 15 in response to an input operation of an operator. The output unit 12 is implemented by a display apparatus such as a liquid crystal display or a print apparatus such as a printer.

The communication control unit 13 is implemented by a Network Interface Card (NIC), and controls communication between the control unit 15 and an external apparatus such as the xTR via the network.

The storage unit 14 is implemented by a Random Access Memory (RAM), a semiconductor memory element such as a Flash Memory, or a storage apparatus such as a hard disk and an optical disc, and stores parameters of a generation model of data learned by detection processing to be described below. Note that the storage unit 14 may be configured to communicate with the control unit 15 via the communication control unit 13. The storage unit 14 of the present embodiment stores mapping information 14a and communication destination candidate information 14b.

The mapping information 14a is information in which a terminal identifier (EID) for identifying the terminal 30 and locator information (RLOC) indicating the xTR 20 to which the terminal 30 is connected are associated.

The communication destination candidate information 14b is information in which the terminal identifier (EID) for identifying the terminal 30, a candidate terminal identifier for identifying a candidate terminal that is the communication destination candidate of the terminal 30, and candidate locator information indicating the xTR 20 to which the candidate terminal is connected are associated.

Here, FIG. 3 is a diagram illustrating a data configuration of the mapping information 14a and the communication destination candidate information 14b. As illustrated in FIG. 3, in the mapping server 10 of the present embodiment, the mapping information 14a and the communication destination candidate information 14b are integrated and stored in the storage unit 14. Specifically, in the example illustrated in FIG. 3, the EID and the RLOC are included as the mapping information 14a. The communication destination candidate information 14b includes the EID and the RLOC of the communication destination candidate corresponding to the EID.

In FIG. 3, the locator information (RLOC=A) of the xTR #1 to which the terminal X (EID=a::1) is connected is illustrated, for example, as the mapping information 14a. For example, as the communication destination candidate information 14b, the terminal Y (EID=c::1) and a terminal Z (EID=a::3) are illustrated, for example, as the communication destination candidates of the terminal X. The locator information (RLOC=N) of the xTR #n to which the terminal Y is connected and the locator information (RLOC=B) of an xTR #2 to which the terminal Z is connected are illustrated as the locator information of the xTR 20 to which the terminal 30 as the communication destination candidate is connected.

Note that the mapping server 10 updates the mapping information 14a by using the latest mapping information acquired periodically or according to a request of each terminal 30.

For example, the mapping server 10 stores, as the communication destination candidate information 14b, the candidate terminal identifier and the candidate locator information for the communication destination candidate designated by a user of the terminal 30. Specifically, for example, the operator inputs the EIDs of the predetermined number of terminals of the communication destination candidates declared by the user in advance to the mapping server 10.

The mapping server 10 acquires the locator information of the xTR 20 to which the terminal 30 as the communication destination candidate is connected while referring to the mapping information 14a, and stores the acquired locator information as the communication destination candidate information 14b. For example, when the mapping information 14a is updated, the mapping server 10 also updates the locator information of the xTR 20 to which the terminal 30 as the communication destination candidate is connected.

The mapping server 10 may store, as the communication destination candidate information 14b, the candidate terminal identifiers and the candidate locator information for the communication destination candidates selected based on a communication history of the terminal 30. For example, the mapping server 10 acquires the communication history of the terminal 30 from each xTR 20, and selects the EIDs of the predetermined number of terminals 30 as the communication destination candidates in order of higher priority decided by the number of times of communication or a communication time. For example, the mapping server 10 selects the communication destination having a higher priority in descending order of the number of times of communication. Alternatively, the mapping server 10 selects the communication destination having a higher priority as the communication time becomes the latest.

The mapping server 10 acquires the locator information of the xTR 20 to which the selected terminal 30 is connected while referring to the mapping information 14a, and stores the acquired locator information as the communication destination candidate information 14b. In this case, for example, when the mapping information 14a is updated, the mapping server 10 also updates the locator information of the xTR 20 to which the terminal 30 as the communication destination candidate is connected.

The mapping server 10 may store, as the communication destination candidate information 14b, the candidate terminal identifier and the candidate locator information for the communication destination candidate selected in order of priorities weighted according to the terminal 30 or a type of the communication of the communication history of the terminal 30. For example, the mapping server 10 weighs the terminal 30 in which a delay or a packet loss is not allowed such that the priority becomes higher, and selects the EIDs of the predetermined number of terminals 30 as the communication destination candidates in order of higher priority.

As described above, the mapping server 10 acquires the locator information of the xTR 20 to which the selected terminal 30 is connected while referring to the mapping information 14a, and stores the acquired locator information as the communication destination candidate information 14b. For example, when the mapping information 14a is updated, the mapping server 10 also updates the locator information of the xTR 20 to which the terminal 30 as the communication destination candidate is connected.

Description will be made with reference to FIG. 2 again. The control unit 15 is implemented by using a Central Processing Unit (CPU), and executes a processing program stored in a memory. Accordingly, the control unit 15 functions as an acquisition unit 15a and a notification unit 15b as illustrated in FIG. 2 as the example. Note that these functional units may be implemented in different pieces of hardware.

The acquisition unit 15a acquires the locator information indicating the xTR 20 and the terminal identifier of the terminal 30 from the xTR 20 to which the terminal 30 is newly connected, and stores the acquired locator information and terminal identifier in the storage unit 14.

Specifically, when the terminal 30 is newly connected to the xTR 20, the xTR 20 transmits REGISTER including the EID of the terminal 30 and the locator information of the xTR 20 itself to the mapping server 10. This REGISTER is a message notifying that the locator information of the xTR 20 to which the terminal 30 is connected is changed. The acquisition unit 15a acquires the mapping information of the terminal 30 included in the REGISTER received from the xTR 20, and updates the mapping information 14a.

The notification unit 15b notifies the xTR 20 to which the terminal 30 is newly connected of the candidate terminal identifier and the candidate locator information stored in the communication destination candidate information 14b of the storage unit 14 in association with the acquired terminal identifier.

Specifically, the notification unit 15b replies an ACK for the REGISTER received from the xTR 20 back to the xTR 20. At this time, the notification unit 15b extracts the locator information and the EID of the terminal 30 as the communication destination candidate associated with the EID of the newly connected terminal 30 while referring to the communication destination candidate information 14b, and notifies of these information during the response, for example, by including the information in the ACK. By doing this, the notification unit 15b notifies the xTR 20 to which the terminal 30 is newly connected of the mapping information of the communication destination candidate.

Accordingly, when the newly connected terminal 30 starts communication with, as the communication destination, any one of the communication destination candidates, the xTR 20 notified of the mapping information of the communication destination candidate can discriminate the locator information of the xTR 20 to which the terminal 30 as the communication destination is connected without inquiring the mapping server 10, and can transfer the packet.

Figure 4:
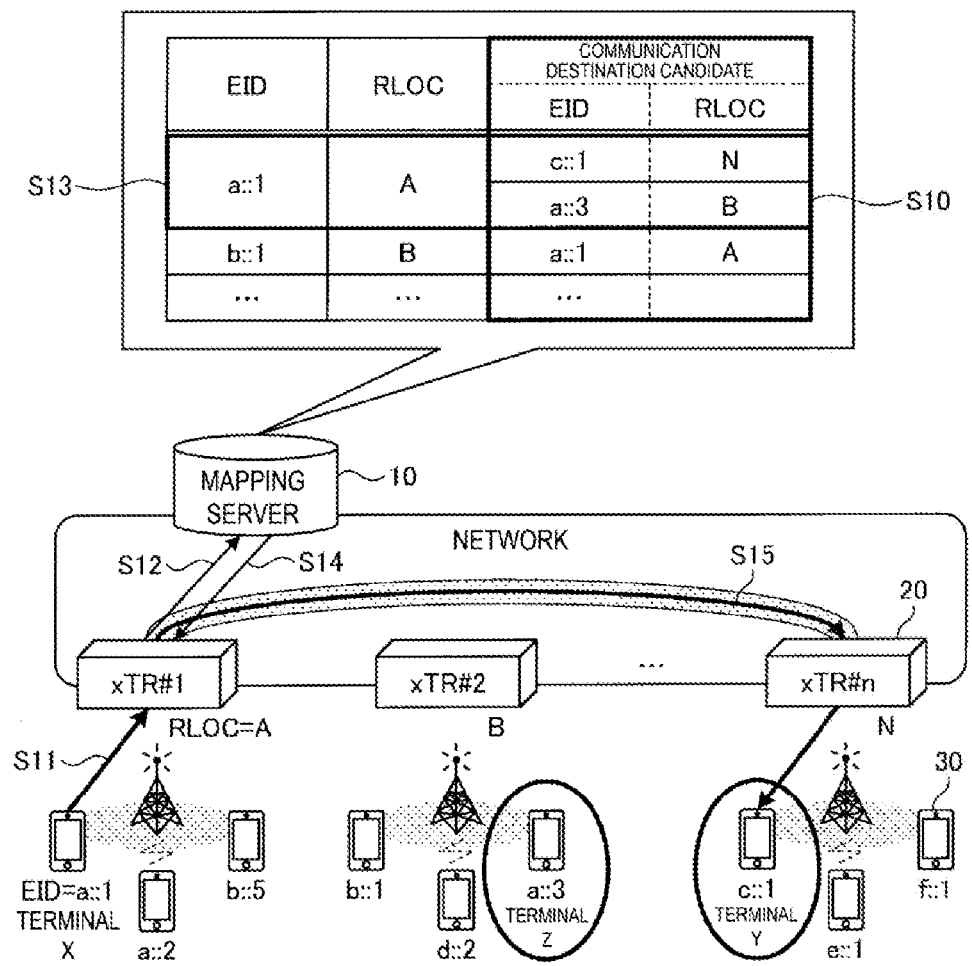
FIG. 4 is an explanatory diagram for describing a notification processing procedure.

Notification Processing FIG. 4 is an explanatory diagram for describing a communication processing procedure. As illustrated in FIG. 4, the mapping server 10 stores the communication destination candidate information 14*b* in advance for the terminal 30 in the network (step S10).

When the terminal X is newly connected to the xTR #1 (step S11), the xTR #1 transmits REGISTER including the EID (a::1) of the terminal X and the locator information (A) of the xTR itself to the mapping server 10 (step S12).

The acquisition unit 15*a* acquires the mapping information (EID=a::1, RLOC=A) of the terminal X included in the REGISTER received from the xTR #1, and updates the mapping information 14*a* (step S13).

Subsequently, the notification unit 15*b* replies an ACK to the REGISTER transmitted by the xTR #1 back to the xTR #1. At this time, the notification unit 15*b* extracts the locator information and the EID of the terminal 30 as the communication destination candidate associated with the EID of the newly connected terminal X while referring to the communication destination candidate information 14*b*, and adds the extracted locator information and EID to the ACK (step S14). In the example illustrated in FIG. 4, the xTR #1 is notified of the EID and the RLOC for the terminal Y (EID=c::1) and the terminal Z (EID=a::3). The terminal Y and the terminal Z are surrounded by circles in FIG. 4.

Accordingly, when the newly connected terminal X starts communication with the terminal Y as the communication destination, the xTR #1 can discriminate the xTR #n to which the terminal Y is connected without inquiring the mapping server 10, and can transfer the packet (step S15). In this manner, when the xTR #1 as the transmission source starts communication with, as the communication destination, any of the terminals 30 included in the communication destination candidates, the xTR #1 can discriminate the locator information of the xTR 20 to which the terminal 30 as the communication destination is connected without inquiring the mapping server 10, and can transfer the packet.

As described above, in the mapping server 10 of the present embodiment, the storage unit 14 stores the terminal identifier (EID) for identifying the terminal 30, the locator information indicating the xTR 20 to which the terminal is connected, the candidate terminal identifier for identifying the candidate terminal that is the communication destination candidate of the terminal 30, and the candidate locator information indicating the xTR 20 to which the candidate terminal is connected in association with each other. The acquisition unit 15*a* acquires, from the xTR 20 to which the terminal 30 is newly connected, the locator information indicating the xTR 20 to which the terminal 30 is newly connected and the terminal identifier of the terminal 30 that is newly connected and stores the locator information and the terminal identifier that are acquired in the storage unit 14. The notification unit 15*b* notifies the xTR 20 to which the terminal 30 is newly connected of the candidate terminal identifier and the candidate locator information stored in association with the terminal identifier that is acquired in the communication destination candidate information 14*b* of the storage unit 14.

Accordingly, when the newly connected terminal 30 starts communication with, as the communication destination, any one of the communication destination candidates, the xTR 20 notified of the mapping information of the communication destination candidate can discriminate the locator information of the xTR 20 to which the terminal 30 as the communication destination is connected without inquiring the mapping server 10, and can transfer the packet.

In this manner, according to the notification processing of the mapping server 10 of the present embodiment, the occurrence of the waiting time required to acquire the locator information of the xTR 20 to which the terminal as the communication destination is connected at the start of communication can be suppressed. Accordingly, an increase in cost of an apparatus for a packet cache can be suppressed, and thus, deterioration in communication speed and quality such as the occurrence of the packet loss or delay can be prevented.

The storage unit 14 stores, as the communication destination candidate information 14*b*, the candidate terminal identifier and the candidate locator information for the communication destination candidate designated by the user of the terminal 30. Accordingly, it is possible to prevent the deterioration in the communication speed and quality of the communication intended by the user.

The storage unit 14 may store, as the communication destination candidate information 14*b*, the candidate terminal identifier and the candidate locator information for the communication destination candidate selected based on the communication history of the terminal 30. Accordingly, the deterioration in the communication speed and quality of the communication can be effectively prevented.

The storage unit 14 may store, as the communication destination candidate information 14*b*, the candidate terminal identifier and the candidate locator information for the communication destination candidate selected in order of priorities weighted according to the terminal 30 or the type of communication of the communication history of the terminal 30. Accordingly, it is possible to reliably prevent the deterioration in the communication speed and quality of the communication with respect to a particularly important terminal 30 and the communication type.

Program

A program in which the processing executed by the mapping server 10 which is the notification apparatus according to the aforementioned embodiment is described in a computer-executable language can be created. As one embodiment, the notification apparatus can be implemented by installing a notification program for executing the notification processing as packaged software or on-line software on a desired computer. For example, an information processing apparatus executes the notification program, and thus, the information processing apparatus can function as the notification apparatus. The information processing apparatus described here includes a desktop or laptop personal computer. In addition, a mobile communication terminal such as a smart phone or a mobile phone and a slate terminal such as a Personal Digital Assistant (PDA) are included in a category of the information processing apparatus. The functions of the notification apparatus may be implemented in a cloud server.

Figure 5:
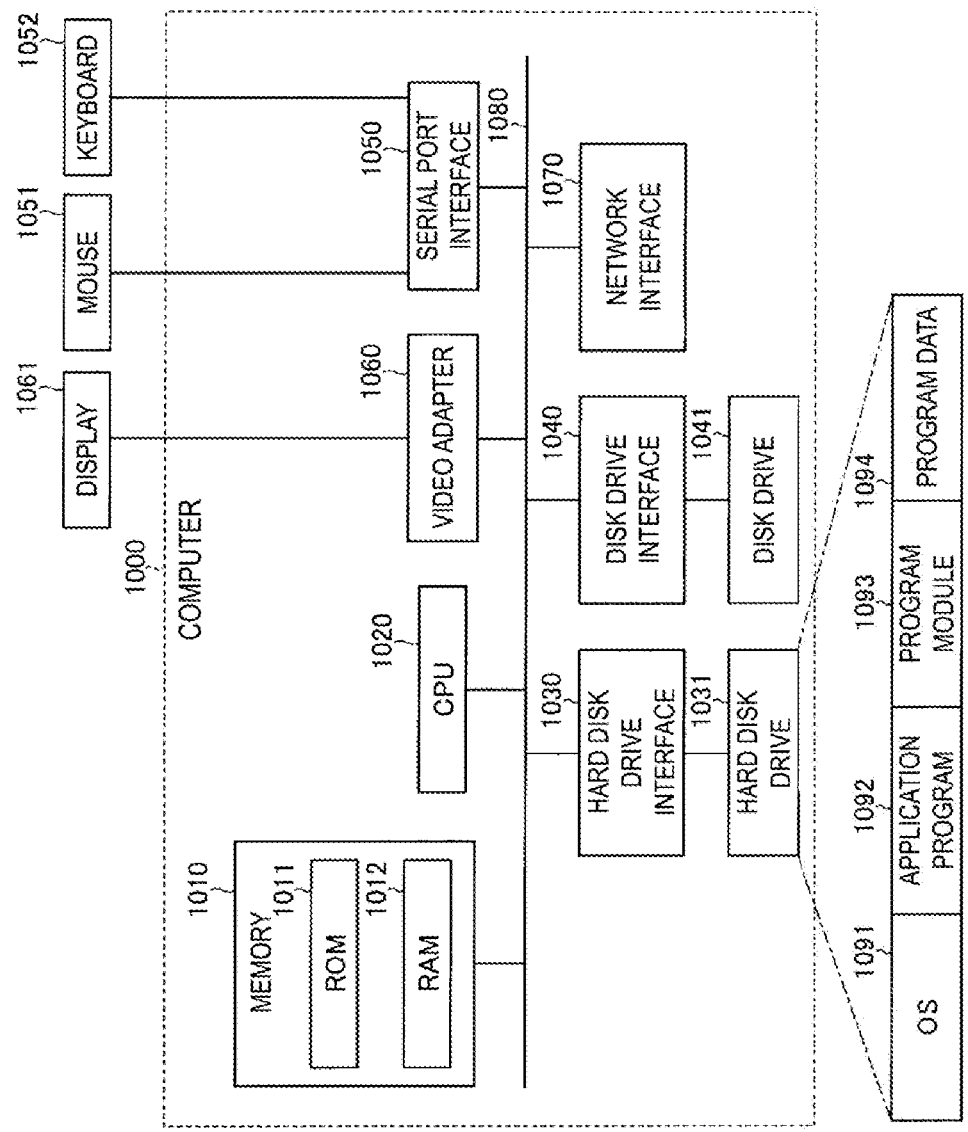
FIG. 5 is a diagram illustrating an example of a computer that executes a notification program.

FIG. 5 is a diagram illustrating an example of the computer that executes the notification program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a RAM 1012. The ROM 1011 stores a boot program, such as Basic Input Output System (BIOS), for example. The hard disk drive interface 1030 is connected to the hard disk drive 1031. The disk drive interface 1040 is connected to a disk drive 1041. A detachable storage medium such as a magnetic disk or an optical disc, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The information described in the aforementioned embodiment is stored in, for example, the hard disk drive 1031 and the memory 1010.

The notification program, for example, is stored as the program module 1093 in which commands to be executed by the computer 1000 are described in the hard disk drive 1031. Specifically, the program module 1093 in which each processing executed by the notification apparatus described in the aforementioned embodiment is described is stored in the hard disk drive 1031.

Data to be used in information processing according to the notification program is stored as the program data 1094, for example, in the hard disk drive 1031. The CPU 1020 reads the program module 1093 and the program data 1094 stored in the hard disk drive 1031 to the RAM 1012 as needed, and executes each of the aforementioned procedures.

The program module 1093 and the program data 1094 relating to the notification program are not necessarily stored in the hard disk drive 1031 and, for example, may be stored in a detachable storage medium and be read by the CPU 1020 through the disk drive 1041. Alternatively, the program module 1093 and the program data 1094 related to the notification program may be stored in another computer connected via a network such as a LAN or a Wide Area Network (WAN) and read by the CPU 1020 via the network interface 1070.

Although the embodiment to which the invention made by the present inventors is applied has been described above, the present invention is not limited by the description and the drawings as a part of the disclosure of the present invention according to the present embodiment. In other words, all of other embodiments, examples, operation technologies, and the like made by those skilled in the art based on the embodiments are within the scope of the present invention.

REFERENCE SIGNS LIST

10 Mapping server (notification apparatus)
11 Input unit
12 Output unit
13 Communication control unit
14 Storage unit
14a Mapping information
14b Communication destination candidate information
15 Control unit
15a Acquisition unit
15b Notification unit
20 xTR (transfer node)
30 Terminal

The invention claimed is:

1. An apparatus for causing terminal connectivity, the apparatus comprising a processor configured to execute a method comprising:
storing, based on a communication between a first terminal and a candidate terminal, a combination of data including:
a terminal identifier corresponding to the first terminal,
first locator information associated with a first transfer node to which the first terminal is connected,
a candidate terminal identifier corresponding to the candidate terminal, and
candidate locator information indicating a candidate transfer node to which the candidate terminal is connected during the communication between the first terminal and the candidate terminal;
acquiring, from a second transfer node to which the first terminal newly connects, second locator information, wherein the second locator information is associated with the second transfer node, and wherein the second transfer node is distinct from the first transfer node;
acquiring a terminal identifier corresponding to the first terminal;
storing the second locator information and the terminal identifier;
retrieving, based on the terminal identifier, the combination of data including the candidate terminal identifier and the candidate locator information;
notifying the second transfer node the combination of data including the candidate terminal identifier and the candidate locator information; and
causing the second transfer node to connect the first terminal with the candidate terminal through the second transfer node and the candidate transfer node.

2. The notification apparatus according to claim 1, the processor further configured to execute a method comprising:
storing the candidate terminal identifier and the candidate locator information associated with the candidate terminal as designated by a user of the first terminal.

3. The apparatus according to claim 1, the processor further configured to execute a method comprising:
storing the candidate terminal identifier and the candidate locator information associated with the candidate terminal as selected based on a communication history of the first terminal.

4. The apparatus according to claim 3,
storing the candidate terminal identifier and the candidate locator information associated with the candidate terminal based on priorities weighted according to the terminal or a type of communication of the communication history of the first terminal.

5. A computer-implemented method for notifying the method comprising:
storing, based on a communication between a first terminal and a candidate terminal through a first transfer node and a candidate transfer node, a combination of data including:
a terminal identifier corresponding to the first terminal,
first locator information associated with the first transfer node to which the first terminal is connected,
a candidate terminal identifier corresponding to the candidate terminal, and
candidate locator information indicating the candidate transfer node to which the candidate terminal is connected during the communication between the first terminal and the candidate terminal;
acquiring, from a second transfer node to which the first terminal is newly connected, second locator information, wherein the second locator information is associated with the second transfer node, and wherein the second transfer node is distinct from the first transfer node;
acquiring the terminal identifier corresponding to the first terminal;
storing the second locator information and the terminal identifier;

retrieving, based on the terminal identifier, the combination of data including the candidate terminal identifier and the candidate locator information;

notifying the second transfer node the combination of data including the candidate terminal identifier and the candidate locator information; and causing the second transfer node to connect from the first terminal to the candidate terminal through the second transfer node and the candidate transfer node.

6. The computer-implemented method according to claim 5, the method further comprising:

storing the candidate terminal identifier and the candidate locator information associated with the candidate terminal as designated by a user of the first terminal.

7. The computer-implemented method according to claim 5, the method further comprising:

storing the candidate terminal identifier and the candidate locator information associated with the candidate terminal as selected based on a communication history of the first terminal.

8. The computer-implemented method according to claim 7, the method further comprising:

storing the candidate terminal identifier and the candidate locator information associated with the candidate terminal based on priorities weighted according to the terminal or a type of communication of the communication history of the first terminal.

9. A system for notification, the system comprises:

a processor; and a memory storing computer-executable instructions that when executed by the processor cause the system to execute a method comprising:

storing, storage, based on a communication between a first terminal and a candidate terminal through a first transfer node and a candidate transfer node, a combination of data including:

a terminal identifier corresponding to a terminal, first locator information associated with the first transfer node to which the first terminal is connected, a candidate terminal identifier indicating the candidate transfer node to which the candidate terminal is connected during the communication between the first terminal and the second terminal;

acquiring, by an acquirer, from a second transfer node to which the first terminal is newly connected, second locator information, wherein the second locator information is associated with the second transfer node, and wherein the second transfer node is distinct from the first transfer node;

notifying the second transfer node the combination of data including the candidate terminal identifier and the candidate locator information; and causing the second transfer node to establish a connect between the first terminal and the candidate terminal through the second transfer node and the candidate transfer node.

10. The system according to claim 9, the computer-executable instructions further cause the system to execute a method comprising:

storing the candidate terminal identifier and the candidate locator information associated with the candidate terminal as designated by a user of the first terminal.

11. The system according to claim 9, the computer-executable instructions further cause the system to execute a method comprising:

storing the candidate terminal identifier and the candidate locator information associated with the candidate terminal as selected based on a communication history of the first terminal.

12. The system according to claim 11, the computer-executable instructions further cause the system to execute a method comprising:

storing the candidate terminal identifier and the candidate locator information associated with the candidate terminal based on priorities weighted according to the terminal or a type of communication of the communication history of the first terminal.

13. The apparatus according to claim 1, wherein the second transfer node includes at least one of an Ingress Tunnel Router and an Egress Tunnel Router.

14. The apparatus according to claim 4, wherein the order of priorities are based at least on a number of communications with the first terminal.

15. The apparatus according to claim 4, wherein the first terminal is higher in priority in connecting to the candidate terminal through the second transfer node when the first terminal is less tolerant to a packet loss of data communication than other terminals.

16. The computer-implemented method according to claim 5, wherein the second transfer node includes at least one of an Ingress Tunnel Router and an Egress Tunnel Router.

17. The notification method according to claim 8, wherein the priorities are based at least on a number of communications with the first terminal.

18. The notification method according to claim 8, wherein the first terminal is higher in priority in connecting to the candidate terminal through the second transfer node when the first terminal is less tolerant to a packet loss of data communication than other terminals.

19. The system according to claim 9, wherein the second transfer node includes at least one of an Ingress Tunnel Router and an Egress Tunnel Router.

20. The system according to claim 12, wherein the priorities are based at least on a number of communications with the first terminal, and wherein the first terminal is higher in priority in connecting to the candidate terminal through the second transfer node when the first terminal is less tolerant to a packet loss of data communication than other terminals.

* * * * *